June 28, 1938. H. P. LUHN 2,122,152
APPARATUS FOR DETERMINING AND INDICATING VARIATIONS
IN THICKNESS OF THREAD OR THE LIKE
Filed April 30, 1935 2 Sheets-Sheet 1
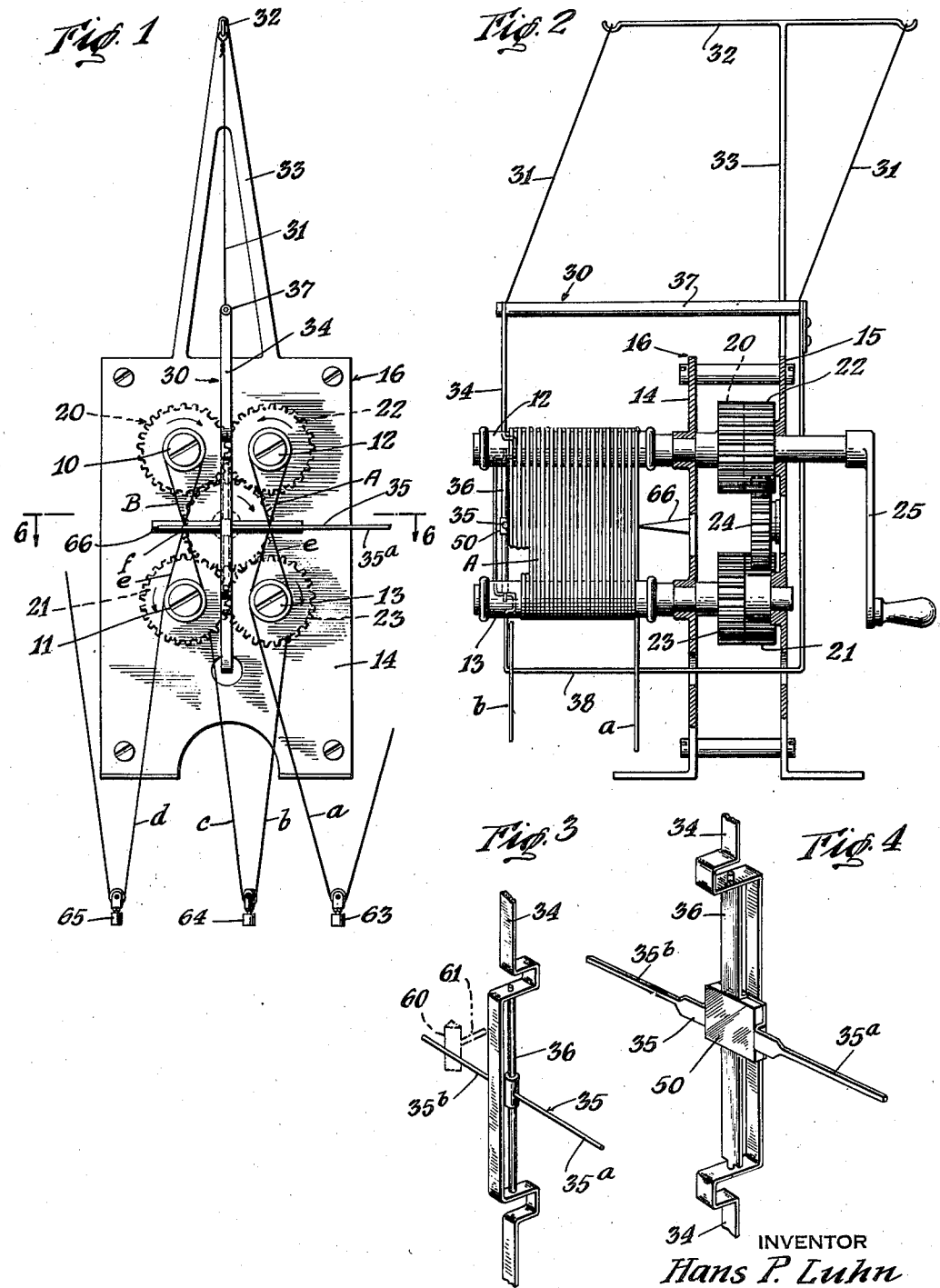
INVENTOR
Hans P. Luhn
BY
Hoguet, Neary & Campbell
ATTORNEYS June 28, 1938.  H. P. LUHN  2,122,152
APPARATUS FOR DETERMINING AND INDICATING VARIATIONS
IN THICKNESS OF THREAD OR THE LIKE
Filed April 30, 1935  2 Sheets-Sheet 2
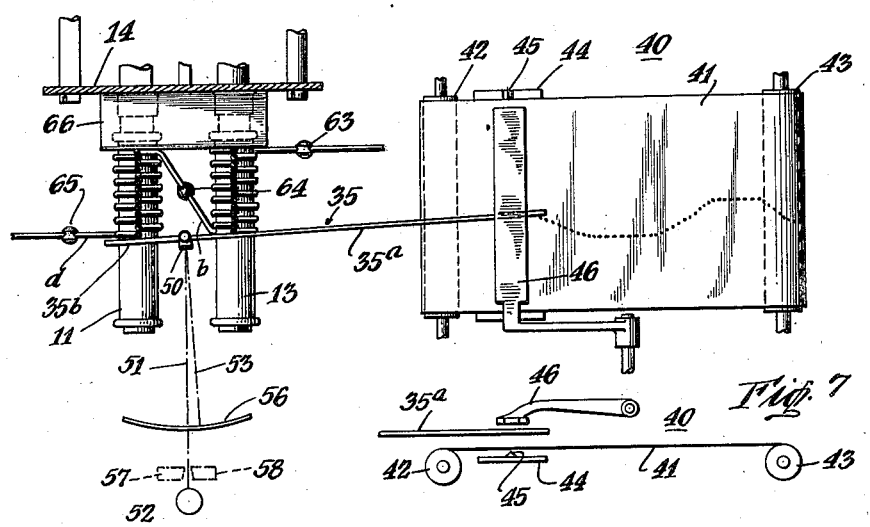
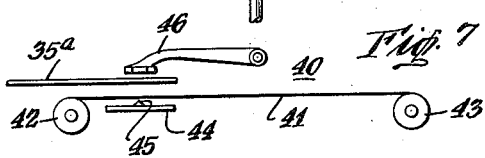
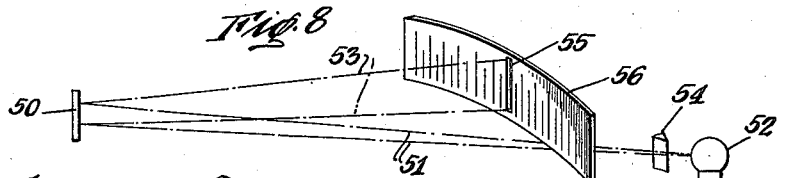
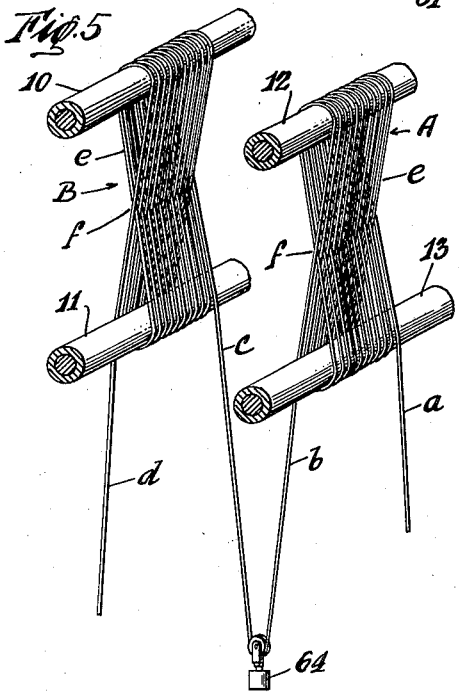
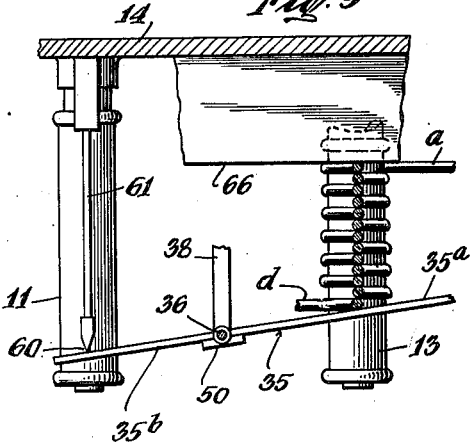
INVENTOR
Hans P. Luhn
BY
ATTORNEYS Patented June 28, 1938

2,122,152

UNITED STATES PATENT OFFICE 2,122,152

APPARATUS FOR DETERMINING AND INDICATING VARIATIONS IN THICKNESS OF THREAD OR THE LIKE

Hans P. Luhn, New York, N. Y.

Application April 30, 1935, Serial No. 19,044

12 Claims. (Cl. 33—143)

This invention relates to the measurement of thread and the like and particularly to apparatus for automatically determining and indicating variations in the thickness of thread. This application is a continuation-in-part of my co-pending application, Serial Number 7,303 filed on February 19, 1935, (issued January 5, 1937, into Patent No. 2,066,411).

Another co-pending application, Serial Number 7,304 also filed February 19, 1935 (issued December 7, 1937, into Patent No. 2,101,260) is entitled "Apparatus for determining variations in thickness of thread". The illustrative embodiment of the invention shown and described in said application comprises apparatus for automatically weighing successive portions of a continuous thread and comparing the weight values in order to determine the variations in thread thickness. The application also discloses means for automatically recording and/or integrating these values as they are obtained by the weighing device so that the evenness value of a continuous length of thread may be easily and quickly ascertained.

Patent No. 2,066,411 mentioned above relates to a method and apparatus for determining the thickness of thread and the illustrative embodiment of the invention shown and described therein comprises means for forming a thread panel that has a width which is proportional to the thickness of the thread being measured. There is also disclosed therein suitable indicating apparatus by means of which the width of the thread panel may be ascertained and/or translated into terms of thread thickness.

In accordance with the present invention, variations in thickness of portions of a continuous thread are determined as in Patent No. 2,101,260, but, herein by comparing the width of two thread panels that are formed according to the disclosure of Patent No. 2,066,411, and each of which has a width that is a factor of the thickness of the thread.

Alternatively, by forming a single thread panel in connection with the apparatus shown and described herein, the actual thickness of successive portions of a continuous thread may be automatically determined.

The present invention also contemplates automatically integrating and/or recording the values representing the variations in thickness, or the actual thickness value, by means of recording apparatus to be described, or by recording and integrating apparatus similar to that disclosed in Patent No. 2,101,260.

One object of the present invention is to automatically determine the thickness of thread.

A second object is to automatically determine variations in the thickness of portions of a continuous thread.

Another object is to automatically control recording and/or integrating mechanisms, or other apparatus, in accordance with the values that are obtained by the measuring apparatus hereof and which represent either variations in or the actual thickness of portions of thread.

Other objects and advantages of the present invention will become apparent upon consideration of the following detailed description of an illustrative embodiment thereof and the appended claims when read in conjunction with the accompanying drawings, in which:

Figure 1 is an end elevation of apparatus embodying the invention;

Figure 2 is a side elevation, partly in section, of the apparatus shown in Figure 1;

Figures 3 and 4 are perspective views on an enlarged scale of different forms of one part included in the apparatus shown in Figures 1 and 2;

Figure 5 is a fragmentary perspective view illustrating the formation of thread panels as mentioned above;

Figure 6 is in part a sectional view on the line 6—6 in Figure 1 illustrating the operation of the measuring apparatus and in part a plan view of recording apparatus controlled by the latter;

Figure 7 is a diagrammatic side elevation of the recorder shown in Figure 6;

Figure 8 is a diagrammatic view of indicating apparatus forming a part of the arrangement illustrated in Figure 6; and Figure 9 is a partial sectional view illustrating the use of the apparatus of Figures 1–8, for determining the actual thickness of thread.

In the drawings, the numerals 10, 11 and 12, 13, respectively, designate two pairs of parallel mounted rollers operable by individual shafts journalled in the plates 14, 15 of a rectangular frame work 16. The rollers of each pair are equally spaced and the axes of corresponding rollers of the pairs are in the same horizontal plane. The roller shafts have fixed thereto gears 20 to 23; those for rollers 10 and 11 meshing with those for rollers 12 and 13 respectively, and the gears 21 and 22 being of a width to mesh also with a gear 24 carried by a stub shaft mounted in plate 15. With this arrangement, operation of a crank 25 connected to any of the shafts mentioned above results in driving one roller of each pair (as 10) in a direction opposite to that of the other roller (11), thereof, as well as that of the corresponding roller (12), of the other pair.

The respective pairs of rollers are adapted to have thread panels formed on and between the rollers 10, 11 and 12, 13 in a manner similar to that disclosed in Patent No. 2,066,411. Each panel is formed of thread wound in "figure 8" form, as shown in Figure 5, both panels being made up of successive portions of a continuous and unbroken thread; all as will be more fully described as this description proceeds.

Associated with both pairs of rollers is a frame 30, shown as rectangular, that is freely suspended, as by wires 31, from a cross member 32 carried by a standard 33 secured to and extending above plate 15. The part 34 of frame 30 extends centrally between the pairs of vertically aligned rollers 10, 11 and 12, 13. Hingedly or pivotally carried on the part 34 is a straight edged member 35 adapted to contact the forward or outer edges of both thread panels A and B at or closely adjacent the points thereof where the constituent threads cross or intermesh. The cross-piece 32, wires 31 and the top bar 37 of frame 30 form a parallelogram so that the frame is held against canting and is suspended in such a manner that the "contactor" 35 is biased toward and into contact with the forward edges of both thread panels. As shown in Figures 3 and 4, the contactor 35 also has its hinge or pivoting trunnion 36 so arranged on the part 34 of frame 30 that its pivotal movement on the part 34, in response to change in the width of either thread panel, is about the axis of the part 34. The contactor 35 has a portion 35a extending over a record chart and the part 35b may be made heavier, provided with weights, or otherwise arranged so that parts 35a, 35b are balanced.

Associated with the contactor 35 is a recording apparatus 40 shown in diagrammatic form in Figures 6 and 7 including a carbon, smoked or otherwise markably surfaced record sheet 41 drawn from a supply roll 42 to a take-up roll 43. Positioned beneath the record sheet is a platen 44 having a fine ferrule or straight edge 45 extending across the width of the sheet. The contactor 35 extends over platen 44 above sheet 41 so that when a pivoted striking member, or hammer 46 is depressed, a mark will be made upon the record sheet. Inasmuch as the oscillating movements of the contactor 35 are in response to differential changes in width of the two panels A, B, it may be seen that the recording apparatus provides means for intermittently, or continuously, recording variations in the width of the panels, and hence, as will be explained hereinafter, of the extent of the variation and rate of change in thickness of thread passing over the measuring apparatus.

Although an instantaneous indication of the differential variation in thickness of the thread may be afforded by the opposite end 35b of the member 35 moving over a suitably graduated scale, the embodiment described herein utilizes a mirror 50 carried by the member 35 for this and other analogous purposes. As shown in Figures 6 and 8, considered jointly, the mirror 50 is mounted on contactor 35 at its point of oscillation and a beam 51 of light is directed upon it from a suitable light source 52 through a prism 54 adapted to form a narrow band of light. Thus the reflected beam 53 of light may form a narrow band 55 of light upon a scale 56 that is suitably graduated so that as the thickness of the thread varies, the amount of variation in successive portions of the thread may be read therefrom.

Alternatively, focusing prism 54 may be omitted and the reflected ray of light may be directed to a pair of mirrors or prisms 57, 58, Figure 6, comprising part of a follow-up mechanism, such as that disclosed in Patent No. 2,101,260. Generally this mechanism consists of a carriage in which are mounted the mirrors or prisms 57, 58. The carriage is slidable along a guide member and is moved therealong by a threaded column driven by a reversible motor. Actuating the motor in opposite directions are two photo-electric cells connected through suitable relays to the motor. The ray of light reflected by mirror 50 is directed by either prism 57 or 58 depending upon the deflection of the beam from the center position to its corresponding photo-electric cell, thereby energizing the corresponding relay system and causing the reversible motor to rotate the threaded column and move the carriage to a position in which the beam of light is directed between the prisms. The carriage is provided with a stylus which records the movements of the former on a moving chart.

An indication and/or a record of the actual thickness of the thread passing through the measuring apparatus, as distinguished from measurements of variations in thickness thereof may be obtained by forming a thread panel upon a single pair of rollers, as is shown in Figure 9. For this purpose, a fulcrum 60 extending perpendicularly to the portion 35b of the contactor 35 is provided on a bracket 61 supported on the frame plate 15; the fulcrum 60 being located substantially in coincidence with the center line between the axes of the rollers 10 and 11. Consequently, the movement of contactor 35 takes place about the fulcrum 60, in response to variations in the width of the thread panel on the rollers 12, 13 and against which the portion 35a of the contactor is maintained engaged.

As will be explained hereinafter, the variations in the width of a thread panel are proportional to the thickness of the thread then passing over the rollers and, as a result, the indicating, recording, or other apparatus, that responds to the movements of the contactor 35 directly reflects changes in the thickness of the thread.

Variations in, or the actual thickness of thread is determined with the above described apparatus in the following manner. The thread to be measured is led from a suitable supply source and after passing around a tensioning device 63 extends in a reach $a$ to be wound upon the rollers 12, 13. Passing from the latter in a reach $b$, $c$, and about a tension device 64 the thread is then wound in a like number of turns upon the rollers 10, 11 and passes from the latter in a reach $d$, around a suitable tensioning device 65 and thence to the point at which the thread is used, or to a take-up roller.

The thread is wound between the rollers of both pairs in a like number of figure 8 turns, as illustrated, for example, in Figure 5. Portions of the thread extend partially around one roller, as 12, and tangentially from one side thereof to the opposite side of the other roller, as 13, partially around the latter to the top thereof and thence tangentially therefrom to the opposite side of the first roller. The thread passes from roller 12 around tensioning device 64 and thence to the beginning of the first turn on roller 10, as indicated at $b$, $c$. With this arrangement the portions e of the thread that extend from the top of one roller to the bottom of the second cross and are interlaced with adjacent portions extending from the top of the second roller to the bottom of the first in such a manner as to cause an automatic readjustment of the thread on the rollers during their operation.

To obtain a reliable indication of thread thickness it is necessary to line up the thread portions because it is practically impossible to wind thread by hand on rollers or other supports so that the thread is distributed evenly and under equal tension and diametral compression. Winding the thread on rollers by hand causes some of the portions thereof, that lie on and extend between the rollers, to be disposed so that they lie parallel to each other and normally to the axes of the rollers while other thread portions extend between the rollers at various angles with respect to their axes. Furthermore, in distributing the thread on the rollers by hand some of the thread portions will be more tightly applied than others, with the result that the tension on different portions will vary. Moreover, some of the thread portions will be crowded against adjacent portions, causing the latter portions to be compressed diametrally to varying degrees while other portions may be spaced sufficiently so that such a compressive force is not applied thereto. Because of these conditions it would be impossible to accurately determine the thread thickness by simply measuring the width of a thread panel and dividing by the number of thread turns on the rollers even if the panel were formed by carefully trying to lay thread portions in side-by-side relation.

However, in accordance with the present invention it is not necessary to even attempt to wind the thread evenly and in parallelly-extending portions between the rollers, because the figure 8 winding causes the threads to be properly rearranged in the operation of the apparatus regardless of whether or not the thread was carefully wound, or even if a number of portions are wound over or across other portions.

When the crank 25 is turned, all of the rollers 10 to 13 are driven, the rollers 10 and 13 rotating clockwise, for example, and 11 and 12 counterclockwise, so that the rollers as 10 and 11 of each pair rotate in opposite directions. As thread is taken up by the rollers 12, 13 to replace the panels formed manually thereon, it progresses outwardly thereof maintaining the panel thereon and then passes to rollers 10, 11 maintaining a similar panel on these rollers and finally the thread is discharged from the roller 10, or 11. At the same time there is an axial movement of the thread panels inwardly towards the plate 15, causing the thread intersections f on the inner edges of each panel to contact a straight edge 66 which serves as a reference point for measuring the panel widths. This axial movement of the thread panels is caused by a force which is resultant of the tension applied to all the thread portions of the panels extending between the rollers and the force on the thread portions due to their slightly angular relation with respect to the axes of the rollers. This inward movement of the panels takes place at the same time that the thread itself progresses outwardly.

Because of the interlacing of the thread portions e that extend between the rollers, the thread forms its own guide for spacing those thread portions which extend partially about the rollers evenly along each roller, and for disposing those portions which extend between the rollers in parallel relation to each other. The interlacing of the thread also causes the thread portions extending between the rollers to exert a slight force on each other axially of the rollers which, in addition to assisting axial movement of the panel, results in positioning these thread portions closely adjacent each other at their line of intersection f.

The axial movement of thread panels, due to the arrangement of the thread on the rollers and the rotation of the latter, together with the tension exerted on the thread and acting to take up any slack, thus causes the thread portions forming the panels to readjust their positions and line up in orderly fashion in compact contiguous relation to form panels of a certain width. Once the thread portions forming panels have been readjusted so that the tension applied to the thread balances the axial contracting force, the width of a panel of thread does not change although rotation of the rollers may be continued; that is, of course, unless and until the thickness of the moving thread changes.

In their readjusted positions all of the adjacent portions of the thread panel are under equal tension. Further, the compressive forces applied diametrally to various thread positions are slight on all thread portions. Therefore, inasmuch as the portions of the thread are evenly lined up, are under equal tension and the diametral compressing forces are also equal and small, the width of the panel may be measured to afford an accurate indication of thread thickness or variations in the latter.

Assuming a thread of initially even thickness and hence panels A, B to be of equal width:

When the contactor 35 is brought into engagement with the forward edges of both panels at the intersections f of the interlaced threads thereof, it assumes a position of equilibrium in a vertical plane parallel to the edges of the panels or parallel to plate 15. However, when the width of either panel changes due to the fact that the thickness of the thread composing the same changes, the member 35 is deflected, either to the right or to the left in a horizontal plane, Figure 4, as it swings about its axis 36. Accordingly, the movement of the extension 35a of the contactor 35 over chart 41 of the recording mechanism is directly responsive to changes in the width of the two panels. The extent of its movement corresponds with the differential existing between the width of the panels and its rate of movement corresponds to the rate of change in thickness of the thread.

Assuming that the thread fed to the rollers is initially of uniform thickness, the width of the panels A, B, is the same and the contactor 35 remains at rest. Consequently the record made upon the chart 41, whether intermittently or continuously, is in the form of a straight line. The mirror 50, Figures 6 and 8, also remaining at rest reflects the light beam to form a stationary band of light upon the scale 56 at the zero point. Where follow-up mechanism, such as disclosed in Patent No. 2,101,260, is employed, the travelling element thereof controlled by mirrors or prisms 57, 58 remains at rest until the width of the panel changes.

When the thread drawn to roller 12 increases in thickness, the thread portions of larger diameter coming upon the rollers 12, 13 displace the thread forming other parts of the panel A outwardly, or to the left; it being remembered that the member 66 acts as a reference point and prevents the thread panel from increasing in width towards the right. As a consequence of the increase in width of panel A on the rollers 12, 13, while the rollers 10, 11 still retain a panel B formed of the smaller diameter thread, the width of panel A becomes greater than that of panel B, resulting in a corresponding clockwise deflection of the contactor 35 about its axes. Inasmuch as a differential now exists between the width of the panels A, B, the movement of the contactor 35 causes this differential to be recordable on the chart 41 and also deflects the band 55 of light on the scale 56 to an extent corresponding with the difference in width that exists between the two panels. In its movement the recording extension 35a of contactor 35 traces a curve part that is inclined above the base line at an angle corresponding with the rate of change of thread thickness and of an extent commensurate with the amount of change.

As the thread of increased diameter passes to rollers 10, 11 and replaces thread portions already thereon in the manner described above, the width of the panel B increases. In the event that the thread portion which is of increased thickness has a length at least sufficient to form two complete thread panels the width of panel B gradually approaches and eventually equals that of panel A. As the panel B increases in width and attains the width of the panel A, contactor 35 swings counterclockwise (in the direction opposite to its previous movement) and returns to a position of equilibrium, tracing a downwardly deflected part of the record curve toward the base line and again becomes disposed to trace a straight line upon the chart 41 parallel to the base line.

If the thickness of the thread now decreases to or below its initial value, or to an intermediate value, the panel A decreases in width as thin thread replaces that on the rollers 12, 13. As the thinner thread portions occupy less space axially of the rollers the adjacent thicker thread portions move inwardly because of the tendency of the panel to move in this direction and maintain its inner edge against member 66, as described above. Consequently, contactor 35 swings further counterclockwise (note Fig. 6) beyond its equilibrium position to an extent approaching its maximum deflection clockwise. This deflection equals the maximum opposite oscillation when the panel A is all of thinner thread and panel B is of the thicker, providing the thinner thread corresponds to the initial thickness. In this counterclockwise movement the contactor continues tracing a downwardly deflected curve part now extending below the base line; and of an extent equal to that of the upwardly extending part if the thread has returned to initial thickness.

As the thread portions of panel B also are replaced by the thinner thread, the panel decreases in width and the contactor 35 again reversing its direction moves clockwise and eventually reassumes its equilibrium position when both panels are of equal width, that is of thread of like thickness. In this movement the contactor again traces an upwardly extending curve part.

Likewise, when thread of initial uniform thickness on the rollers, 12, 13 is replaced by thread of smaller thickness, the width of panel A decreases with respect to that of panel B and the contactor 35, engaging both panels, swings beyond equilibrium in a counterclockwise direction to indicate this thickness of the thread as measured by the change in the width of the panel. It is not deemed necessary to describe the entire sequence of operations for this condition since it is believed the manner in which the apparatus responds should be apparent from the above description.

It should be understood that so long as the contactor 35 is in motion a record curve portion traced upon the chart 41 is inclined with reference to straight line portions of the curve to a degree corresponding with the rate of change of thickness of the thread forming the changing thread panel and its extent corresponds to the change in thickness of the thread.

It may be seen from the previous description that inasmuch as the width of either panel as it exists at any time upon either pair of rollers is directly proportional to the thickness of the thread from which the panel is formed, the movements of the contactor 35 and hence the indications afforded on the scale 56 and by recording mechanisms accurately represent variations in the thickness of the thread.

This is because the control exercised by the contactor 35 upon recording mechanisms, or other apparatus, reflects the extent of change in thread thickness, the rate by which such change takes place in the thread and the lengths of thread portions in which variations occur or which are of uniform thickness. The angularity of portions of a recorded curve represent the rate of change in thickness and the extent of such portions represent the degree of change. Straight line portions of the curve represent thread portions of even thickness, although aligned straight curve portions do not necessarily represent thread portions of like diameter.

Where a continuous record is made, whether by operating recording mechanism such as is disclosed in Patent No. 2,101,260, as suggested above, or by obtaining a continuous record from the contactor 35 upon a record sheet, all of the values thus automatically obtained and recorded may be integrated to determine the average evenness of the entire length of thread represented by the record curve portions considered.

It is desirable when testing threads which are of different designated diameters that the values representing evenness should be comparable. It is apparent that the same actual variation of thickness in a thin thread and in a thick thread would represent variations of different degree. For instance, a variation of 5 microns for a thread diameter of 50 microns is a change of 10%, while in a thread of 66 microns diameter it is only 7½%. Consequently, the actual differential values, determined as described above, should all be based upon variations in a thread of determined standard diameter, for example, a thread of 55 microns. Then comparable results may be obtained by applying a corrective factor corresponding to the ratio between the diameter of the determined standard and the diameter of the thread being tested. Thus, when testing threads of 51 or 70 microns, respectively, comparable results are obtainable by applying the factor 55/51 or 55/70 to the values obtained with the apparatus.

An indication or a record of the actual thickness of the thread, as contrasted with values representing variation in thickness, may be obtained as indicated in Figure 9. When employing the apparatus for this purpose a thread panel is formed upon only one pair of rollers, as for example upon the rollers 12, 13. Fulcrum 60 is then positioned in the center line of the axes of rollers 10, 11 and forwardly of plate 15, at a position corresponding with the forward edge of the thread panel as initially compactly formed upon the rollers 12, 13. Thereafter when the thread upon the rollers 12, 13 is replaced by other portions of thread, the contactor 35 is deflected about the fulcrum 60 as the width of the panel and hence the thickness of thread changes so that the indications provided on scale 56 or on a record sheet now represent the actual thickness of the thread. It is also to be understood that the response of follow-up mechanism, whether associated with recording mechanism as in Patent No. 2,101,260, or for controlling other apparatus, such as a machine in which the thread is utilized, is then directly responsive to the actual thickness of the thread.

Although different forms of apparatus embodying the invention and the manner in which they may be employed in accordance with the invention have been shown and described in detail herein, it is to be understood that these embodiments are afforded only for the purpose of illustrating the invention. There are many changes and variations which may be made without departing from the invention and, therefore, it is desired and intended to include all such variations and changes within the scope of the appended claims.

I claim:

1. Apparatus for determining the thickness of thread or the like comprising; means for supporting a thread panel that consists of successive portions of thread and which has a width proportional to the thickness of said thread portions; means associated with the supporting means for engaging an edge of the panel and movable in response to variations in width of said panel; and means controlled by said last means for indicating the thickness of said thread.

2. Thread controlled apparatus comprising; means for supporting a thread panel that consists of successive portions of thread and which has a width proportional to the thickness of said thread portions; means for feeding a continuous thread to and discharging it from said supporting means to continuously replace the thread portions of said panel by successive portions of said thread for continuously maintaining a thread panel on said supporting means; and means for measuring variations in width of the panel operable in response to changes in the width of the thread panel on said supporting means as the thread fed to and discharged therefrom varies in thickness.

3. Apparatus for automatically determining variations in the thickness of thread comprising; means for supporting thread in the form of two spaced panels consisting of like numbers of thread portions and having widths proportional to the thickness of the thread portions forming the respective panels; and means coacting with an edge of and movable in response to variations in width of each of said panels for comparing the widths thereof.

4. Apparatus for automatically determining variations in the thickness of thread comprising; means for supporting thread in the form of two spaced panels consisting of like numbers of thread portions and having widths proportional to the thickness of the thread portions forming the respective panels; means associated with the supporting means engaging an edge of each of the panels and movable in response to variations in width of the panels, and means controlled by said last means for indicating differences in the thickness of the thread portions forming the respective panels.

5. Apparatus for automatically determining variations in the thickness of thread comprising; means for moving and supporting thread in the form of two panels consisting of like numbers of thread portions and having widths proportional to the thicknesses of the thread portions forming the respective panels; and means cooperating with said panels and movable in response to changes in the relative widths thereof for indicating variations in width of the panels.

6. Apparatus for automatically measuring changes in the thickness of successive portions of a continuous thread comprising; means for continuously forming and supporting a thread panel that consists of successive portions of said thread and which has a width proportional to the thickness thereof; and means for measuring the variations in the width of the panel cooperating with said panel and movable in response to variation in its width due to differences in thickness between successive panel-forming portions of said thread.

7. Apparatus for automatically measuring changes in the thickness of successive portions of a continuous thread comprising; means for continuously forming and supporting a thread panel that consists of successive portions of said thread and which has a width proportional to the thickness thereof; means cooperating with said panel and movable in response to variation in its width due to differences in thickness between successive panel-forming portions of said thread; and means controlled by said last means for indicating the thickness of the thread portions forming said panel.

8. Apparatus for automatically measuring changes in the thickness of successive portions of a continuous thread comprising; means for continuously forming and supporting a thread panel that consists of successive portions of said thread and which has a width proportional to the thickness thereof; means cooperating with said panel and movable in response to variation in its width due to differences in thickness between successive panel-forming portions of said thread; and recording means controlled by said last means for making a record of the thicknesses of said thread portions.

9. Apparatus for automatically measuring changes in the thickness of successive portions of a continuous thread comprising; means for continuously forming and supporting a thread panel that consists of successive portions of said thread and which has a width proportional to the thickness thereof; and a member for measuring the variations in the width of the panel engaging one longitudinal edge of said panel and positionable in accordance with the width of said panel.

10. Apparatus for automatically determining variations in the thickness of thread comprising; means for supporting thread in the form of two panels consisting of like numbers of thread portions and having widths proportional to the thicknesses of the thread portions forming the respective panels; and a member for comparing the variations in thickness of the thread engaging corresponding longitudinal edges of said panels and movable in response to changes in the relative widths of said panels.

11. Apparatus for automatically measuring differences in the thickness of thread comprising; two spaced pairs of parallelly mounted members adapted to support thread panels each consisting of closely positioned, parallelly extending, contiguous portions of thread and each having a width proportional to the thickness of the constituent thread portions; stationary means engaging corresponding longitudinal edges of each of said panels; a movable contactor adapted to engage the other longitudinal edge of each of said panels; means for supporting said contactor and maintaining it in continuous engagement with said other edges of both said panels; means for feeding thread to and discharging it from said pairs of members to continuously maintain thread panels thereon by replenishing the thread portions forming the latter, variation in the relative width of co-existent panels on said pairs of members causing movement of said contactor in proportion to the difference in thickness of the thread portions forming said panels.

12. Apparatus for automatically measuring differences in the thickness of thread comprising; two spaced pairs of parallelly mounted members adapted to support thread panels each consisting of closely positioned, parallelly extending, contiguous portions of thread and each having a width proportional to the thickness of the constituent thread portions; stationary means engaging corresponding longitudinal edges of each of said panels; a movable contactor adapted to engage the other longitudinal edge of said panels; means for supporting said contactor and maintaining it in continuous engagement with said other edges of both said panels; means for feeding thread to and discharging it from said pairs of members to maintain thread panels thereon by continuously replenishing the thread portions forming the latter, changes in the relative widths of said panels causing movement of said contactor in proportion to variations in the thickness of portions of thread forming said panels; and indicating means controlled by said contactor and responsive to variations in the thickness of said thread.

HANS P. LUHN.